United States Patent
Masciantonio et al.

(10) Patent No.: US 12,318,848 B2
(45) Date of Patent: Jun. 3, 2025

(54) ELECTROSPINDLE WITH INTEGRATED FEED WITH AUTOMATIC TOOL HOLDER CHANGE

(71) Applicants: CENTRE TECHNIQUE DES INDUSTRIES MECANIQUES, Senlis (FR); Ecole Nationale Superieure d'Arts et Metiers (ENSAM), Paris (FR)

(72) Inventors: Ugo Masciantonio, Proville (FR); George Moraru, Aix-en-Provence (FR)

(73) Assignees: CENTRE TECHNIQUE DES INDUSTRIES MECANIQUES (FR); ECOLE NATIONALE SUPERIEURE D'ARTS ET METIERS (ENSAM) (FR)

( * ) Notice: Subject to any disclaimer, the term of this patent is extended or adjusted under 35 U.S.C. 154(b) by 569 days.

(21) Appl. No.: 17/788,586

(22) PCT Filed: Dec. 15, 2020

(86) PCT No.: PCT/FR2020/052440
§ 371 (c)(1),
(2) Date: Jun. 23, 2022

(87) PCT Pub. No.: WO2021/136893
PCT Pub. Date: Jul. 8, 2021

(65) Prior Publication Data
US 2023/0044987 A1    Feb. 9, 2023

(30) Foreign Application Priority Data
Dec. 31, 2019  (FR) .................................. 1915764

(51) Int. Cl.
B23B 31/26  (2006.01)
B23C 5/26  (2006.01)
B23Q 5/32  (2006.01)

(52) U.S. Cl.
CPC .............. B23B 31/261 (2013.01); B23C 5/26 (2013.01); B23Q 5/326 (2013.01);
(Continued)

(58) Field of Classification Search
CPC ........ B23B 31/261; Y10T 409/309464; B23Q 5/326
(Continued)

(56) References Cited

U.S. PATENT DOCUMENTS 6,234,731 B1 *  5/2001  Sakamoto ................ B23Q 5/20
                                                         409/230
6,951,256 B1 * 10/2005  Xiao ..................... B23B 31/261
                                                         173/4
2017/0095897 A1 *  4/2017  Moraru ..................... B23Q 5/10

FOREIGN PATENT DOCUMENTS

DE    202014104118 U1   12/2015
FR         3018712 A1    9/2015
WO    WO 2015/196856 A1  12/2015

OTHER PUBLICATIONS

International Search Report mailed Apr. 1, 2021 in corresponding PCT International Application No. PCT/FR2020/052440.
(Continued)

*Primary Examiner* — Erica E Cadugan
(74) *Attorney, Agent, or Firm* — OSTROLENK FABER LLP (57) ABSTRACT

A machining spindle that includes a tool-holder shaft (2), a first actuator connected to a coupling member (11) slidably connected to a first section (21) of the shaft to rotate the shaft, a second actuator connected to a nut helically connected to a second section (22) of the shaft to move the shaft
(Continued)

axially and a control rod (24) of a tool-holder attachment system connected to the second section by a full connection. The spindle includes a locking arrangement (40) mounted movable between the first and second sections by a switchover arrangement (50), between a first position in which the first and second sections are in full connection and a second position allowing axial movement of the second section relative to the first section, enabling the control rod to be moved axially under the action of the second actuator to control the attachment system in a released position of the tool holder.

10 Claims, 4 Drawing Sheets

(52) U.S. Cl.
CPC ... *B23B 2270/022* (2013.01); *B23B 2270/025* (2013.01); *B23B 2270/027* (2013.01); *Y10T 408/6793* (2015.01); *Y10T 409/309352* (2015.01); *Y10T 409/309464* (2015.01)

(58) Field of Classification Search
USPC ............................................................ 409/233
See application file for complete search history.

(56) References Cited

OTHER PUBLICATIONS

Written Opinion mailed Apr. 1, 2021 in corresponding PCT International Application No. PCT/FR2020/052440.

* cited by examiner

ELECTROSPINDLE WITH INTEGRATED FEED WITH AUTOMATIC TOOL HOLDER CHANGE

CROSS-REFERENCE TO RELATED APPLICATIONS

The present application is a 35 U.S.C. §§ 371 national stage application of PCT/FR2020/052440, filed Dec. 15, 2020, which claims priority to French Patent Application No. FR1915764, filed on Dec. 31, 2019, the contents of which are incorporated herein by reference.

The present invention relates to the field of machine tools, in particular numerical control machine tools. It relates more particularly to an electric spindle for such a machine.

An electric spindle is a spindle equipped with at least one electric motor and a tool holder, which forms the interface between the machine and the cutting tool that it sets in rotation. Spindles are known from the prior art that differ from conventional spindles in that they have an architecture known as an integrated-feed architecture. In this architecture, the spindle comprises a drive shaft that exhibits two independent movements, namely a rotational movement and a movement in translation, which are each able to be brought about by an actuation chain.

Such a spindle architecture is known from the example thereof given in the document FR3018712. The spindle described in that document has a tool holder shaft mounted so as to be able to pivot about an axis of rotation and to move axially along the axis of rotation. To that end, the shaft is connected to two rotary motors, namely a first motor, which is connected to a coupling member that is slidably connected to a first portion of the shaft in order to drive the shaft in rotation and a second motor, which is connected to a nut that is helically connected to a second portion of the shaft in order to move the shaft axially, the motors being connected to a control unit designed to control the motors independently of one another. Thus, in that architecture, the tool holder shaft is made up of two portions, a splined first portion situated at the front of the spindle, which is slidably connected to the coupling member actuated by the first motor, the coupling member and first motor assembly constituting the actuation module for the rotational movement of the tool holder shaft, and a threaded second portion situated at the rear of the spindle, which is helically connected to the nut actuated by the second motor, the nut and second motor assembly constituting the actuation module for the feed movement of the tool holder shaft.

Thus, the rotational speed and the displacement speed are adjustable independently of one another by means of each motor, the coaxial arrangement of which also ensures relative compactness of the machine, which may also be optimized when the first and second motors are coaxial with the tool holder shaft.

Figure 1:
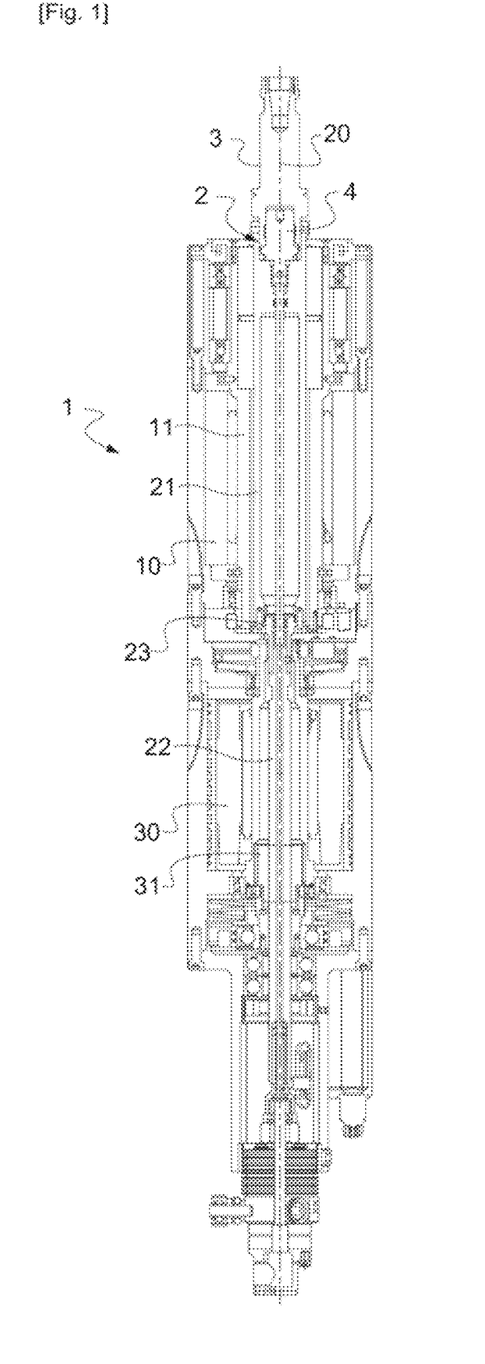
FIG. 1 is a schematic cross-sectional view of a spindle having what is known as an integrated-feed architecture, as described in the preamble.

FIG. 1 illustrates a cross-sectional view of a spindle 1 according to that architecture.

The tool holder shaft 2 of the spindle 1 has a front end on which the tool holder 3 is mounted, by way of an attachment system 4, which may be standardized HSK-type system, also known as a taper/face system, which is particularly appropriate both for automatic tool changes and for manual changes. However, the interface between the tool holder and the spindle could be covered by different proprietary standards.

The tool holder shaft 2 is mounted so as to pivot about an axis of rotation 20 and to move axially along the axis of rotation 20. The shaft 2 is connected to two rotary electric motors, namely a first motor 10 for driving in rotation and a second motor 30 for the axial movement. More specifically, the first motor 10 has a rotor that is rotationally secured to a coupling member 11 designed to be slidably connected to a first portion 21 of the shaft 2 in order to drive the tool holder shaft 2 in rotation. The coupling member 11 is, for example, an internally splined sleeve. The first portion is a splined portion. In other words, the sleeve 11 is pivotably connected to the frame of the machine and slidably connected to the splined portion 21 of the tool holder shaft 2. The sleeve 11 is axially fixed.

The second motor 30 has a rotor that is rotationally secured to a nut 31 fitted on a second portion made up of a threaded portion 22 of the tool holder shaft 2, thereby forming a helical connection for axially moving the shaft 2 when a relative speed is imposed between the coupling member 11 and the nut 31, that is to say when these two elements are rotated at different speeds.

The tool holder shaft is therefore designed such that the splined portion 21 and the threaded portion 22 are separate and follow one another along the axis of rotation 20, respectively from the front to the rear. The two portions 21 and 22 of the drive shaft are in this case connected together by a connecting bushing 23 that is fixed to the respective adjacent ends of the splined portion 21 and of the threaded portion 22. In other words, the threaded portion 21 of the shaft 2 is solidly connected to (in a built-in connection with) the threaded portion 22 of the tool holder shaft. Thus, from a kinematic point of view, the splined portion 21 and the threaded portion 22 of the tool holder shaft constitute a single piece.

However, this architecture makes the conventional automatic tool holder changing systems, of the HSK type for example, impossible to integrate.

This is because, in the spindles of conventional architecture, that is to say without an integrated feed movement, the HSK attachment system of the tool holder mounted at the front of the drive shaft of the tool holder is conventionally actuated for releasing the tool holder by an actuation device. This actuation device is thus capable of automatically placing the tool holder clamped on the HSK attachment system mounted on the spindle in a released state in order to allow the tool holder to be changed. The actuation device conventionally comprises a control rod that can be slid axially in the tool holder shaft of the conventional spindle, the attachment system of the tool holder being able to be moved by way of the control rod between a clamping position and a releasing position, while a device that brings about a clamping force and, in particular, a spring device, is associated with the control rod so as to generate the clamping force of the attachment system of the tool holder. The actuation device also comprises an actuation module which is disposed at the rear of the tool holder shaft of the spindle and by means of which the attachment system can be moved into the releasing position by way of the control rod counter to the clamping force of the spring device. This actuation module can be actuated hydraulically, pneumatically or electrically.

However, in the integrated-feed spindle architectures, as presented with reference to FIG. 1, on account of the presence of the threaded portion 22 of the tool holder shaft 2, the implementation of the actuation device of the HSK attachment system for automatically changing the tool holder, as described above, is rendered impossible, in particular as regards the disposition of the actuation module. Thus, according to the architecture in FIG. 1, the changing of the tool holder 3 involves bringing the tool holder shaft 2 into its position farthest to the right in the figure, corresponding to the maximum travel of the tool, in which position the tool holder is changed manually.

A system capable of addressing the problem of automatic tool holder changing in a tool having an integrated-feed architecture is not currently known. In particular, the problem arises of it being possible to generate the action necessary for clamping/releasing the attachment system of the tool holder, in particular of the HSK type, in an integrated-feed spindle.

An aim of the invention is to solve this problem.

To this end, the invention relates to a machining spindle comprising a tool-holder shaft, having a front end on which a tool holder is able to be mounted via an attachment system between the tool holder and the front end of the shaft, the spindle comprising a first drive actuator for driving the shaft, which is connected to a coupling member that is slidably connected to a first portion of the shaft in order to drive the shaft in rotation, and a second drive actuator which is connected to a nut that is helically connected to a second portion of the shaft in order to move the shaft axially, said first and second portions extending successively along a common length of the shaft between the front end of the shaft and an opposite end of the shaft, the spindle being characterized in that it comprises a control rod for the tool holder attachment system, which is connected to the second portion of the shaft by a solid connection, and in that it comprises locking means mounted so as to be movable between the first portion and the second portion of the shaft by way of switching means, between a first position in which the second portion of the shaft is solidly connected to the first portion of the shaft, and a second position in which the second portion of the shaft is slidably connected to the first portion of the shaft, allowing an axial movement of the second portion with respect to the first portion in order to allow the control rod to be moved axially under the action of the second drive actuator so as to make the attachment system pass into a position releasing the tool holder.

Advantageously, the first portion and the second portion of the shaft are connected together by a bushing coaxially with said first and second shaft portions, said bushing being solidly connected to the first portion of the shaft and slidably connected to the second portion of the shaft.

Advantageously, the locking means comprise a plurality of pivotably mounted locking cams, which have a control surface that is oriented generally radially toward the outside and a locking surface that is able to be positioned in engagement with respective mutually facing stop surfaces of the first and the second shaft portion, in said first position, and to be positioned out of engagement with said respective stop surfaces, in said second position, under the action of the switching means on said control surface.

Advantageously, the locking surface of the cams is elastically urged into said first position.

According to one embodiment, the locking cams are mounted so as to pivot about an axis perpendicular to the axis of the tool holder shaft.

According to another embodiment, the locking cams are mounted so as to pivot about an axis parallel to the axis of the tool holder shaft.

Advantageously, the switching means are made up of actuator rods extending in a plane perpendicular to the axis of the drive shaft, said actuator rods being able to be actuated so as to switch said locking cams into said second position when said tool holder shaft is advanced into a predetermined position for changing the tool holder, in which said actuator rods face the respective control surfaces of the locking cams.

Advantageously, the actuator rods may be actuated hydraulically, pneumatically or electrically.

According to one embodiment variant, the switching means may be made up of the coupling member slidably connected to the first portion of the tool holder shaft and axially fixed, said coupling member coming into sliding contact with the control surface of the locking cams under the effect of the tool holder shaft being advanced into a predetermined position for changing the tool holder, in order to switch the locking cams into said second position when the predetermined position for changing the tool holder is reached.

Advantageously, the attachment system is an attachment system of the HSK type.

Further features and advantages of the present invention will become more clearly apparent from reading the following description, which is given by way of nonlimiting example and with reference to the appended drawings.

In the following text, the same reference numerals are used to described the same parts of the various figures. Furthermore, the same reference numbers as are used in FIG. 1 represent the same parts in FIGS. 2 et seq.

Starting from a known integrated-feed spindle architecture as described in with reference to FIG. 1, the junction zone between the first, splined portion 21 of the tool holder shaft 2 and the second, threaded portion 22 of the tool holder shaft 2 is intrinsically formed, as will now be described in more detail, with reference to FIG. 2 et seq., so as to allow the threaded portion 22 of the shaft to be able to be both solidly connected to the splined portion 21 of the shaft, during normal operating phases of the spindle, and slidably connected to this same portion, during phases of changing the tool holder.

Thus, use is advantageously made of the capacity of the spindle to bring about an axial feed movement of the threaded portion 22 of the shaft via the second motor connected to the nut which is helically connected to the threaded portion 22, to bring about the action necessary for releasing the attachment system 4 of the tool holder 3, when the threaded portion 22 of the shaft is slidably connected to the splined portion, allowing an axial movement of the threaded portion with respect to the splined portion. Thus, in this configuration, by virtue of the use of an actuator that is already present in the spindle, in this particular case the second motor, the use of another dedicated high-power actuation means, as is the case for the conventional actuation devices for clamping and releasing of the tool holder attachment systems, implemented in conventional spindles, is avoided.

A solid connection between two parts means, in the context of the present invention, any connection that does not allow any degree of freedom of one part with respect to the other. It may be, for example, a screw connection, a bonded connection, a soldered connection, etc.

In the following description, it will be noted that the terms "front" and "rear" denote respectively elements or positions that are oriented respectively to the right and to the left in the figures.

Figure 2:
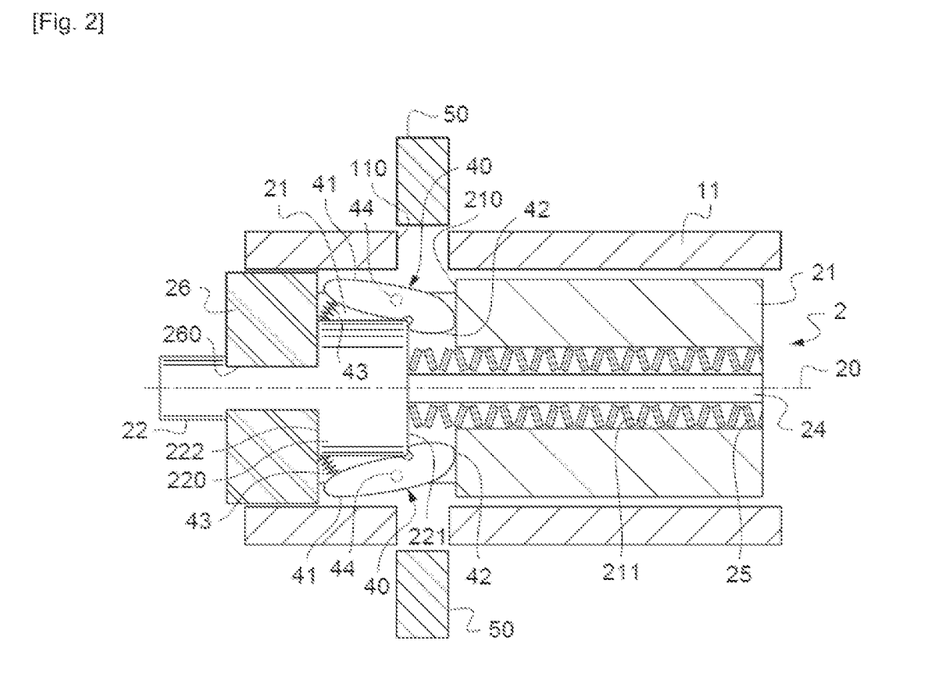
FIG. 2 is a schematic cross-sectional view of the junction zone between the first and second portions of the tool holder shaft in an integrated-feed spindle according to a first embodiment of the invention, with the locking means of the invention in a first position known as the axial locking position, in which no axial movement of the second portion with respect to the first portion is allowed, this first position being taken up for a normal mode of operation of the spindle (machining, positioning etc.)

With reference to FIG. 2, the junction zone of the threaded portion 22 and of the splined portion 21, which follow one another from the rear to the front along the tool holder shaft 2 of the spindle, is more specifically shown in cross section. As has already been described with reference to FIG. 1, the splined portion 21 of the tool holder shaft 2 is slidably connected to the sleeve 11, which, for its part, is axially fixed and able to be driven in rotation by the first motor, which is described in FIG. 1 and not shown here.

A control rod 24 of the attachment system of the tool holder (not shown in FIG. 2) mounted at the front end of the tool holder shaft 2 is solidly connected to the threaded portion 22 of the shaft 2. In other words, the threaded portion 22 of the tool holder shaft and the control rod 24 form a single part from a kinematic point of view.

The control rod 24 has a rear end embedded at a front end portion 220 of the threaded portion 22, which is delimited by a front stop surface 221 and a rear stop surface 222, extending radially with respect to the axis 20 of the tool holder shaft 2. The control rod 24 extends from this front end portion 220 of the threaded portion 22, passing through an axial hollow portion 211 of the splined portion 21 of the tool holder shaft 2, in which the control rod 24 is allowed to slide, as far as a front end connected to the attachment system of the tool holder. The attachment system of the tool holder is designed to be moved by way of the control rod 24 between a clamping position and a releasing position of the tool holder, a return device 25, in this case a return spring 25, being associated with the control rod 24 so as to generate the clamping force of the attachment system of the tool holder.

The front end portion 220 of the threaded portion 22 of the shaft 2 extends in a recess of the splined portion 21 of the shaft 2, next to a rear stop surface 210 of the splined portion 21, extending radially with respect to the axis 20 of the tool holder shaft. In other words, the front and rear radial stop surfaces 221 and 210, respectively, of the threaded portion 22 and of the splined portion 21 face one another, and extend substantially at a distance from one another in the configuration in FIG. 2.

Furthermore, the threaded portion 22 and the splined portion 21 of the tool holder shaft 2 are connected together by a bushing 26 that is coaxial with said portions, solidly connected to the splined portion 21 of the shaft, for the one part, and slidably connected to the threaded portion 22 of the shaft, for the other part. The bushing 26 prevents any relative rotational movement between the threaded portion 22 and the splined portion 21 of the shaft.

The bushing 26 is disposed at the rear of the front end portion 220 of the threaded portion 22 of the tool holder shaft.

It is, for example, fixed by screws to the splined portion 21 of the shaft. In other words, the splined portion 21 of the shaft 2 and the bushing 26 form a single part from a kinematic point of view. The part of the threaded portion 22 of the shaft that extends behind the front end portion 220 is, for example, provided with female splines in which male splines 260 with which the bushing 26 is provided engage, such that the threaded portion 22 of the shaft may be able to slide axially with respect to the splined portion 21 of the shaft.

Specifically, in the configuration in FIG. 2, this ability of the threaded portion 22 to slide axially with respect to the splined portion 21 is not allowed.

Figure 3:
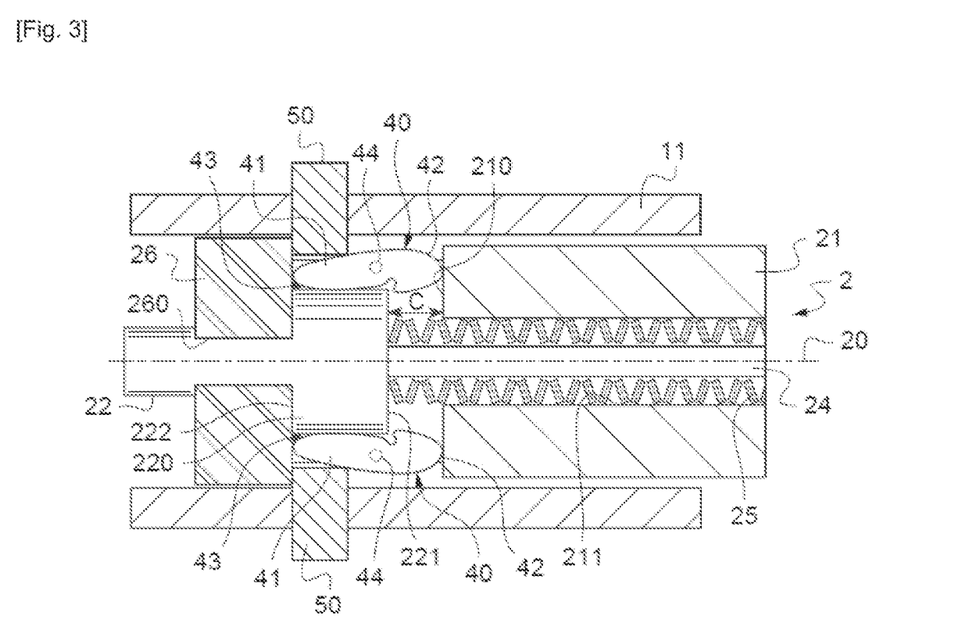
FIG. 3 corresponds to the view in FIG. 2, with the locking means of the invention placed this time in a second position, known as the axial unlocking position, allowing axial movement of the second portion with respect to the first portion of the tool holder shaft, this second position being taken up for a mode of operation corresponding to automatic changing of the tool holder of the spindle.

This is because the junction zone between the threaded portion 22 and splined portion 21 of the tool holder shaft 2 is provided with locking means 40, which are mounted so as to be movable between the threaded portion 22 and the splined portion 21 of the shaft between a first position, known as the axial locking position, corresponding the one in FIG. 2, in which the threaded portion 22 of the shaft is solidly connected to the splined portion 21 of the shaft, and a second position, known as the axial unlocking position, corresponding to the one in FIG. 3, in which the threaded portion 22 of the shaft is slidably connected to the splined portion 21 of the shaft, allowing axial movement of the threaded portion 22 with respect to the splined portion 21.

These locking means are advantageously made up of a plurality of locking cams 40, mounted so as to pivot about a respective pivoting axis 44. Each locking cam 40 has a control surface 41 oriented generally radially toward the outside and extending behind the cam with respect to its pivot axis 44, and a locking surface 42, on the opposite side from the control surface with respect to the pivot axis. This locking surface 42 is able to be positioned so as to be engaged with the respective mutually facing stop surfaces 221 and 210 of the threaded portion 22 and of the splined portion 21 of the shaft, corresponding to the axial locking position as illustrated in FIG. 2, and to be positioned out if engagement with said respective stop surfaces, corresponding to the axial unlocking position as illustrated in FIG. 3. The passage from the axial locking position of the cams 40 to their axial unlocking position is effected under the action of switching means, which act on the control surface 41 of the cams in order to pivot them about their pivot axis 44.

According to the exemplary embodiment in FIG. 2, the switching means are made up of actuator rods 50 which extend in a plane perpendicular to the axis 20 of the drive shaft 2. They are arranged, for example, at the outer periphery of the sleeve 11 and intended to pass through corresponding holes 110 made in the wall of the sleeve 11.

Advantageously, the locking surface 42 of the cams 40 is urged elastically into engagement with the respective mutually facing stop surfaces 221 and 211 of the threaded portion 22 and of the splined portion 21 of the shaft, by way of a spring 43. The latter thus ensures the locking position of the cams 40 in the normal mode of operation of the spindle.

According to the exemplary embodiment illustrated in the figures, the locking cams 40 are mounted so as to pivot about an axis 44 perpendicular to the axis 20 of the tool holder shaft. They are contained in a plane substantially parallel to the axis 20 of the tool holder shaft. They are housed, for example, in axial grooves made in the splined portion 22 of the tool holder shaft 2.

In a variant, the locking cams 40 could be contained in a plane substantially perpendicular to the axis 20 of the tool holder shaft 2. In other words, according to this variant, they are mounted so as to pivot about an axis parallel to the axis 20 of the tool holder shaft.

In the configuration in FIG. 2, the threaded portion 22 is solidly connected to the splined portion 21 of the tool holder shaft 2. Specifically, on the one hand, the splined portion 21 cannot rotate with respect to the threaded portion 22, on account of the bushing 26. On the other hand, the threaded portion 22 and the splined portion 21 cannot exhibit axial relative movement between one another, since the locking surface 42 of the cams 40 is forced into abutment against the respective mutually facing front and rear stop surfaces of the threaded portion 22 and of the splined portion 21. In other words, the bushing 26 prevents the relative rotational movement between the threaded portion 21 and the splined portion 21 of the shaft 2 and the cams 40, in their axial locking position, as illustrated in FIG. 2, prevent the relative axial movement between the threaded portion 22 and the splined portion 21 of the shaft 2. Moreover, the rear stop surface 222 of the front end portion 220 of the threaded portion 22 is in abutment against the bushing 26.

This operating configuration corresponds to the normal mode of operation of the spindle (machining, positioning, etc.).

There are at least two locking cams 40, preferably at least three, even more preferably at least four, so as to ensure good contact rigidity, in spite of the vibrations generated during the normal mode of operation of the spindle.

The other mode of operation, corresponding to the changing of the tool holder, will now be described. To this end, first of all the tool holder shaft 2 is brought into a predetermined position for changing the tool holder. This may be, for example, the farthest forward position of the shaft 2.

Figure 4:
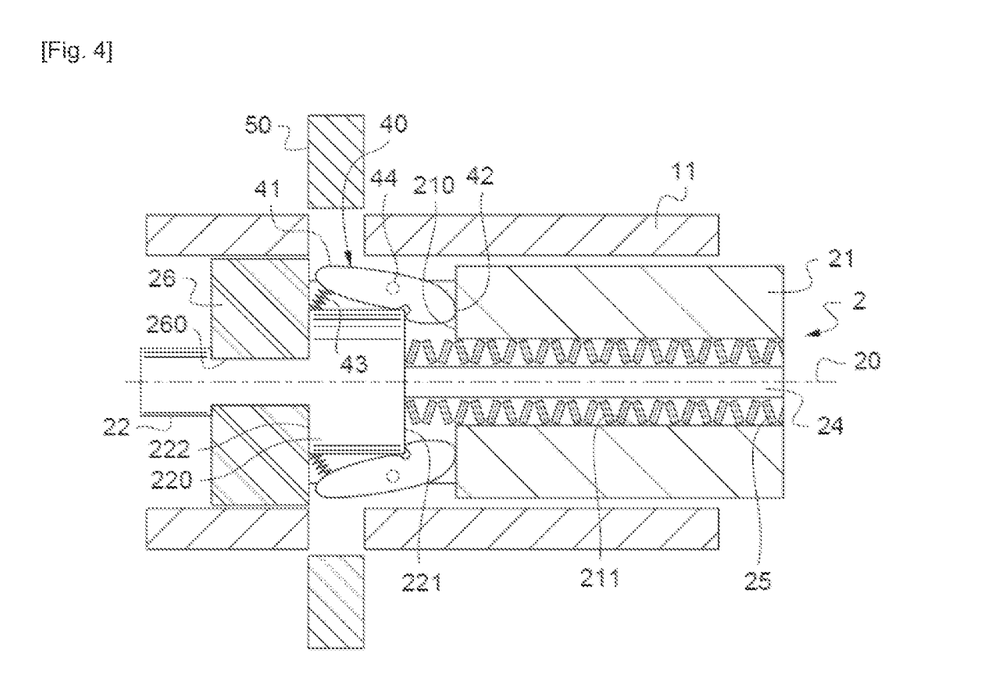
FIG. 4 is a schematic cross-sectional view of the spindle of the invention, illustrated in an intermediate phase with respect to the views in FIGS. 2 and 3, in which the tool holder shaft has been brought into a predetermined position for changing the tool holder.

In this predetermined position for changing the tool holder, illustrated in FIG. 4, the control surfaces 41 of the locking cams 40 are disposed next to the corresponding holes 110 made in the wall of the sleeve 11 and therefore next to the actuator rods 50. Thus, the actuator rods 50 are ready to be actuated to switch the locking cams 40 from their first position, known as the locking position, illustrated in FIG. 2, into their second position, known as the unlocking position, illustrated in FIG. 3.

The actuator rods 50 can be actuated hydraulically, pneumatically or electrically. In any event, the power required here for the actuation of the locking cams in order for them to pass from their first position into their second position is relative low. It needs at the least to be sufficient to oppose the return force of the springs 43.

Thus, as illustrated in FIG. 3, once the tool holder shaft has been brought into the predetermined position for changing the tool holder, the actuator rods 50 are actuated in the direction of the locking cams 40, in order to press on the control surfaces 41 of the cams so as to pivot them into their unlocking position. In this position, the locking surfaces 42 of the cams are switched out of engagement with the respective mutually facing stop surfaces 221 and 210 of the threaded portion 22 and of the splined portion 21 of the shaft.

In this position, the threaded portion 22 of the tool holder shaft 2 is therefore axially unlocked with respect to the splined portion 21 and is allowed to slide axially with respect to the latter by virtue of being slidably connected to the bushing 26. Under the effect of the actuation of the second motor 30 (not shown here), used normally for the axial movement of the tool holder shaft 2, driving the nut fitted on the threaded shaft 22 in rotation, as described with reference to FIG. 1, the threaded portion 22 can be driven in a feed movement with respect to the splined portion 21, which, for its part, is axially locked with respect to the threaded portion 22. According to this exemplary embodiment, the axial stopping of the splined portion 21 is realized by abutment with the actuator rods 50 that have been lowered through the holes 110 in the sleeve 11.

Figure 5:
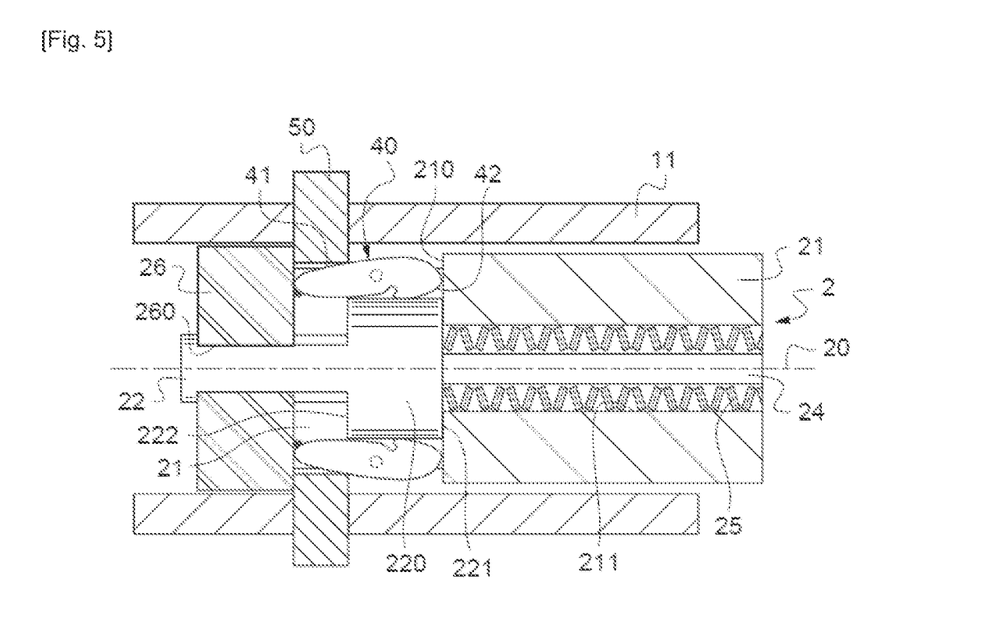
FIG. 5 corresponds to the view in FIG. 3 and illustrates the axial feed movement of the second portion with respect to the first portion, which is allowed by the switching of the locking means into the second position.

Thus, the driving of the threaded portion 22 brings about a feed movement of the threaded portion 22 with respect to the splined portion 21 along a given feed travel C, making it possible to move the attachment system of the tool holder into the releasing position, by way of the control rod 24, counter to the clamping force of the spring device 25. This releasing position of the attachment system of the tool holder is illustrated in FIG. 5, and corresponds to the position in which the front radial stop surface 221 of the front end portion 220 of the threaded portion 22 comes into abutment against the rear radial stop surface 210 of the splined portion 21. The given feed travel is, for example, of the order of a few millimeters and corresponds to the distance between the front radial stop surface 221 of the front end portion 220 of the threaded portion 22 and the rear radial stop surface 210 of the splined portion 21, when the rear radial stop surface 222 of the front end portion 220 of the threaded portion 22 is in abutment against the bushing 26.

The feed movement of the threaded portion 22, when the latter is slidably connected to the splined portion 21, therefore advantageously makes it possible to bring about the action necessary for releasing the tool holder.

Figure 6:
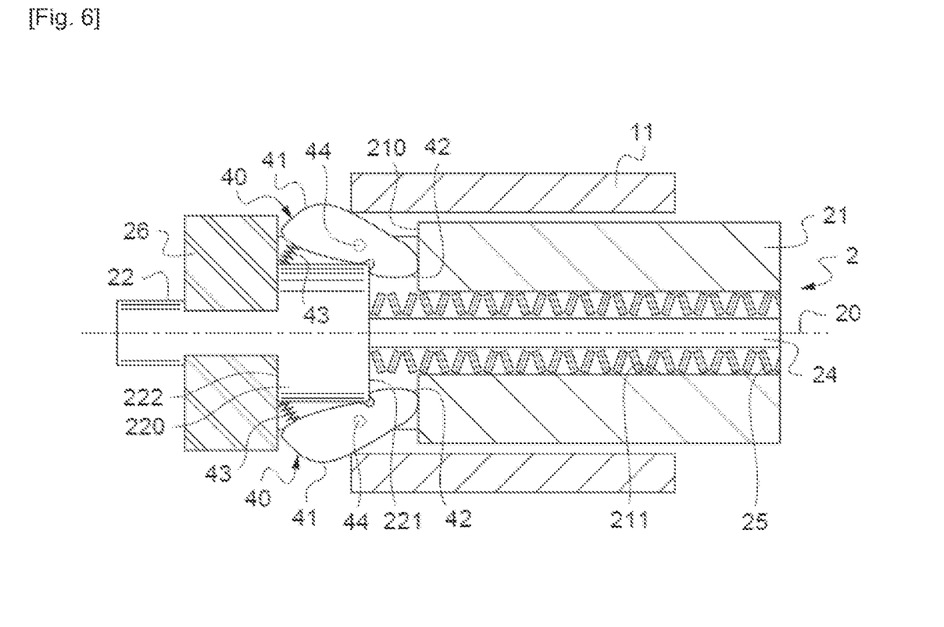
FIG. 6 is a schematic cross-sectional view of the spindle of the invention, illustrating an embodiment variant relating to the switching of the locking means from their axial locking position into their axial unlocking position.
Figure 7:
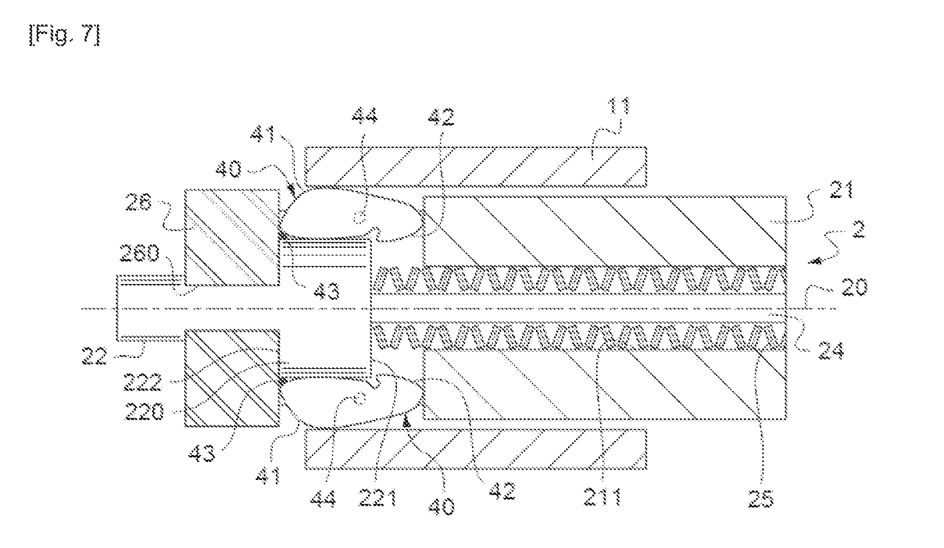
FIG. 7 corresponds to the view in FIG. 6, in which the locking means have been switched into the axial unlocking position.

FIGS. 6 and 7 illustrate an embodiment variant of the switching means which are used to pivot the locking cams 40 from their axial locking position to their axial unlocking position. According to this embodiment variant, the actuator rods 50 are no longer necessary for this purpose. With reference to FIG. 6, the locking cams 40 are positioned in their axial locking position, in which the threaded portion 22 and the splined portion 21 of the tool holder shaft 2 are solidly connected. Still with reference to FIG. 6, the tool holder shaft 2 is brought into the predetermined position for changing the tool holder. The locking cams 40 are disposed such that, during the feed movement of the shaft 2 to the predetermined position for changing the tool holder, the sleeve 11 comes into sliding contact with the control surface 41 of the locking cams 40 under the effect of the feed of the shaft 2. The sleeve 11 thus presses on the cams 40, countering the return force of the springs 43, in order to switch them into their axial unlocking position, when the predetermined position for changing the tool holder is reached.

In this predetermined position for changing the tool holder, which is illustrated in FIG. 7, the locking surfaces 42 of the cams 40 have been switched out of engagement with the respective mutually facing stop surfaces 221 and 210 of the threaded portion 22 and of the splined portion 21 of the shaft. The threaded portion 22 of the tool holder shaft 2 is therefore axially unlocking with respect to the splined portion 21 and is allowed to slide axially with respect to the latter by virtue of being slidably connected to the bushing 26. In this position, the bushing 26 is in abutment against the sleeve 11 by way of an external peripheral radial stop surface 261 of the bushing 26. The abutment of this stop surface 261 of the bushing 26 against the sleeve 11 makes it possible to axially lock the splined portion 21 of the tool holder shaft with respect to the threaded portion 22. However, the axial locking of the splined portion 21 with respect to the threaded portion 22 could be ensured by any other appropriate stop surface.

Then, in the same way as explained above with reference to FIG. 5, the driving of the threaded portion 22 thus unlocked axially with respect to the splined portion is used to bring about the feed movement of the control rod 24 along the given feed travel, this being necessary for the movement of the attachment system of the tool holder into the releasing position.

The invention claimed is:

1. A machining spindle comprising:
a tool-holder shaft, having a front end on which a tool holder is able to be mounted via an attachment system between the tool holder and the front end of the shaft, the spindle further comprising:
a first drive actuator for driving the shaft, which first drive actuator is connected to a coupling member that is slidably connected to a first portion of the shaft in order to drive the shaft in rotation, and
a second drive actuator which is connected to a nut that is helically connected to a second portion of the shaft in order to move the shaft axially, said first and second portions extending successively along a common length of the shaft between the front end of the shaft and an opposite end of the shaft,
the spindle comprising:
a control rod for the tool holder attachment system, which control rod is connected to the second portion of the shaft by a solid connection, and
locking means mounted so as to be movable between the first portion and the second portion of the shaft by way of switching means, between a first position in which the second portion of the shaft is solidly connected to the first portion of the shaft, and a second position in which the second portion of the shaft is slidably connected to the first portion of the shaft, allowing an axial movement of the second portion with respect to the first portion in order to allow the control rod to be moved axially under the action of the second drive actuator so as to make the attachment system pass into a position releasing the tool holder.

2. The spindle as claimed in claim 1, wherein the first portion and the second portion of the shaft are connected together by a bushing that is coaxial with said first and second shaft portions, said bushing being solidly connected to the first portion of the shaft and slidably connected to the second portion of the shaft.

3. The spindle as claimed in claim 1, wherein the locking means comprise a plurality of pivotably mounted locking cams, wherein each of the pivotably mounted locking cams has a respective control surface that is oriented generally radially toward an outside and each of the pivotably mounted locking cams has a respective locking surface, wherein the control surfaces and the locking surfaces are able to be positioned in engagement with respective mutually facing stop surfaces of the first and the second shaft portions, in said first position, and to be positioned out of engagement with said respective stop surfaces, in said second position, under the action of the switching means on said control surfaces.

4. The spindle as claimed in claim 3, wherein the locking surfaces of the cams are elastically urged into said first position.

5. The spindle as claimed in claim 3, wherein the locking cams are mounted so as to pivot about an axis perpendicular to the axis of the tool holder shaft.

6. The spindle as claimed in claim 3, wherein the locking cams are mounted so as to pivot about an axis parallel to the axis of the tool holder shaft.

7. The spindle as claimed in claim 3, wherein the switching means are made up of actuator rods extending in a plane perpendicular to the axis of the tool holder shaft, said actuator rods being able to be actuated so as to switch said locking cams into said second position when said tool holder shaft is advanced into a predetermined position for changing the tool holder, in which predetermined position said actuator rods face the respective control surfaces of the locking cams.

8. The spindle as claimed in claim 7, wherein the actuator rods are actuated hydraulically, pneumatically or electrically.

9. The spindle as claimed claim 3, wherein the switching means are made up of the coupling member slidably connected to the first portion of the tool holder shaft, wherein the coupling member is axially fixed, said coupling member coming into sliding contact with the control surface of the locking cams under the effect of the tool holder shaft being advanced into a predetermined position for changing the tool holder, in order to switch the locking cams into said second position when the predetermined position for changing the tool holder is reached.

10. The spindle as claimed in claim 1, wherein the attachment system is an attachment system of the HSK type.

* * * * *